United States Patent [19]
Evans et al.

[11] Patent Number: 5,826,833
[45] Date of Patent: Oct. 27, 1998

[54] SYSTEM FOR PROVIDING AN AIR/GROUND SIGNAL TO AIRCRAFT FLIGHT CONTROL SYSTEMS

[75] Inventors: Monte R. Evans, Federal Way; Kioumars Najmabadi, Bellevue; Edward E. Coleman, Lake Forest Park; Leo L. Engstrom, Jr., Lynnwood, all of Wash.

[73] Assignee: The Boeing Company, Seattle, Wash.

[21] Appl. No.: 441,282

[22] Filed: May 15, 1995

[51] Int. Cl.$^6$ ...................................................... B64C 13/16

[52] U.S. Cl. ............................ 244/183; 340/959; 364/427

[58] Field of Search ..................................... 244/194, 191, 244/181, 183, 178, 186, 187; 364/421, 426.05; 340/959, 972

[56] References Cited

U.S. PATENT DOCUMENTS

| | | | |
|---|---|---|---|
| 3,077,109 | 2/1963 | Gold | 340/959 |
| 3,241,362 | 3/1966 | Scott | 340/959 |
| 4,327,437 | 4/1982 | Gelderloos | 244/194 |
| 4,638,437 | 1/1987 | Cleary et al. | 340/959 |
| 5,167,385 | 12/1992 | Hafner | 244/195 |
| 5,446,666 | 8/1995 | Bauer | 364/427 |

*Primary Examiner*—Galen L. Barefoot
*Attorney, Agent, or Firm*—Christensen O'Connor Johnson & Kindness PLLC

[57] ABSTRACT

A number of different combinations of "true/false" conclusions of the air/ground condition of an aircraft are analyzed and compared to automatically provide a signal to a flight control system of the aircraft to indicate whether the aircraft is in the air or on the ground, particularly during transition from air to ground or from ground to air.

20 Claims, 7 Drawing Sheets

SYSTEM FOR PROVIDING AN AIR/GROUND SIGNAL TO AIRCRAFT FLIGHT CONTROL SYSTEMS

FIELD OF THE INVENTION

The present invention relates to a system for determining whether an aircraft is in flight or on the ground, particularly at or close to the moment of takeoff or landing.

BACKGROUND OF THE INVENTION

Sophisticated flight control systems such as those used in the Boeing 777-200 provide computer augmentation for controlling the positions of adjustable flight control surfaces. For some flight control surfaces, particularly pitch control surfaces such as elevators, it is extremely important that the flight control systems receive a reliable indication of whether the aircraft is in the air or on the ground, preferably promptly upon a transition between the two conditions. For example, if a control system erroneously judges the aircraft to be on the ground when it is in the air, even just a short time after takeoff, stability augmentation required to provide adequate pitch handling qualities during flight may be turned off. Similarly, if a control system erroneously judges the airplane to be in the air when it is on the ground, activation of the in-flight pitch control may lead to improper elevator adjustment before takeoff has occurred.

There have been prior systems for declaring an aircraft in the air or on the ground, primarily for input to autopilot systems. However, the known prior systems rely on a small number of different inputs to make the air/ground determination, including landing gear altitude based on a radio altimeter signal. If a valid radio altimeter signal is not available, the autopilot function that used the ratio altimeter signal is not available, and the aircraft is flown on "manual." Such a system does not provide the availability that is required for the flight control system to be functional in both autopilot and manual operation at all times.

SUMMARY OF THE INVENTION

The present invention provides an improved system for providing an air/ground signal to aircraft flight control systems. A number of different combinations of "true-false" conclusions of the air/ground condition are analyzed to assure that an accurate signal is given. In the preferred embodiment, the system analyzes several combinations of conclusions based on landing gear altitude, calibrated airspeed, Mach number, aircraft pitch attitude, landing gear truck attitude, ground speed, and detected weight on landing wheels in making the air/ground determination. Accommodations are made for "invalid" or suspect signals, as well as for failure of one or more of the sensing devices used to determine the individual inputs. The result is a reliable air/ground determination, including essentially immediate signaling of transition from ground to air at takeoff, and air to ground at landing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
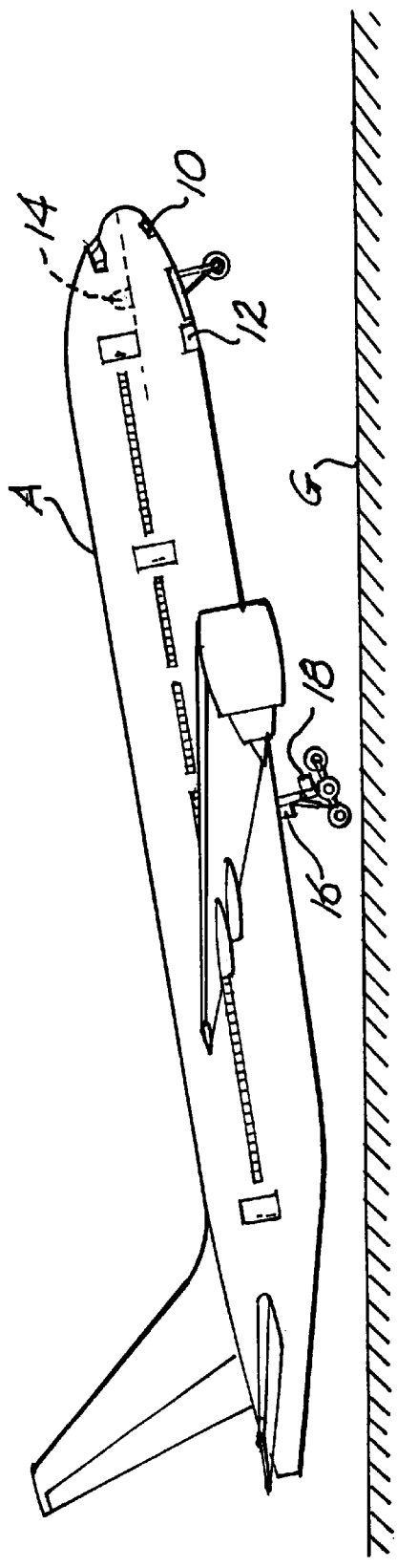
FIG. 1 is a diagrammatic side elevation of an aircraft having a system for providing an air/ground signal to a flight control system in accordance with the present invention, showing an approximation of the attitude of the aircraft before landing or after takeoff.

FIG. 1 illustrates the approximate position of an aircraft A relative to ground (a landing strip or runway) G after takeoff or before landing. The present invention uses signals based on several sensors, at least three and preferably at least four, in making a determination of whether the aircraft is in the air or on the ground. Sensors used in the present invention can be of conventional design and are shown very diagrammatically in FIG. 1. A calibrated airspeed (CAS) signal and a signal of Mach number rely on a conventional pitot tube 10. A landing gear altitude signal relies on a standard radio altimeter 12. A conventional inertial reference unit (IRU) 14 provides indications of aircraft attitude relative to the horizon (pitch) and ground speed. A weight-on-wheels (WOW) signal can rely on conventional strain gauges 16 mounted on the main landing gear posts to provide an indication as to whether or not force is above or below a predetermined force, indicative of the aircraft resting on the ground. A landing gear truck attitude signal can, by use of standard limit switches 18, indicate whether or not truck angle relative to the gear posts indicates the upward swinging (TILT) of the gear truck that occurs at takeoff or the abrupt downward shifting of the gear truck (UNTILT) that indicates touchdown. Processing the outputs of the sensors, as described in detail below, provides the indication of in-air or on-ground operation of the aircraft which is crucial for various flight control systems, particularly those which automatically adjust flight control surfaces.

Figure 2:
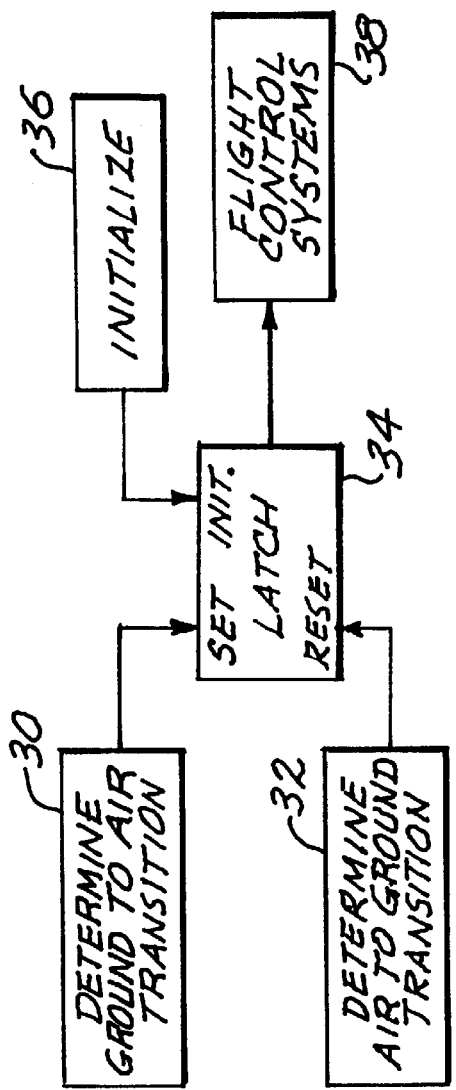
FIG. 2 is a block diagram of the system for providing an air/ground signal in accordance with the present invention, including components for determining ground to air transition, air to ground transition, and initialization function, and a latch for processing signals from such components.

FIG. 2 illustrates the primary functions performed by the system in accordance with the present invention. One procedure is followed for determining ground to air transition (represented by box 30); and another procedure is used to determine air to ground transition (box 32). Corresponding outputs control the state of a latch 34 which, at power-up or under change-over conditions, is initialized as represented by box 36. The output of latch 34 constitutes the air/ground signal to the flight control systems 38.

Figure 3:
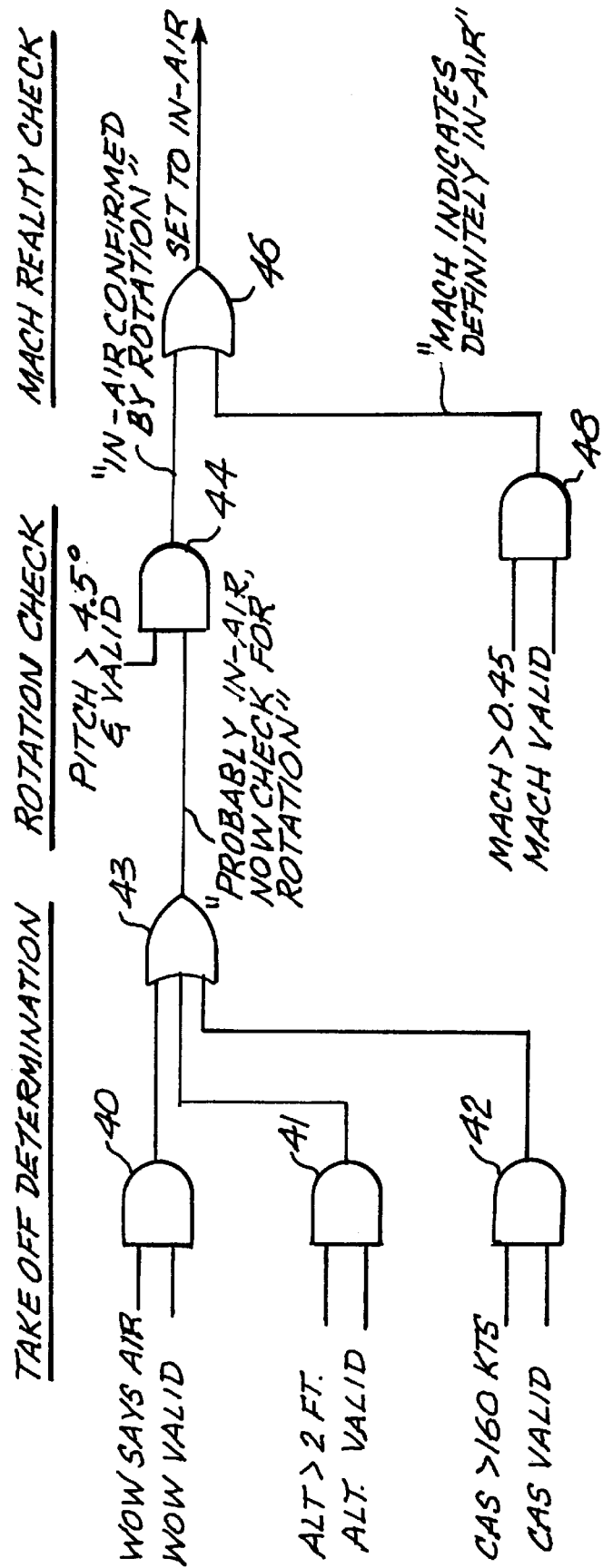
FIG. 3 is a logic diagram of the ground to air transition determination function of the present invention.

Ground to air transition determination is represented in the logic diagram of FIG. 3. As noted above, several "true" (in-air) or "false" (on-ground) signals are analyzed by the system in accordance with the present invention. In addition to the basic true-false signals, many signals have a corresponding check of signal integrity as noted by the "valid" indications in the drawings. Each signal is preferably generated by multiple sensors for which the expected range of outputs is known. If there is close correspondence between the signals from sensors of the same type, and if the signals are within the expected range, a "true" signal results at the "valid" input. Otherwise, a "false" signal results based on the unreliable or inconsistent signals from the sensors. Except as noted, the discussion below assumes a "valid" determination has been made for each instance noted in the drawings. Otherwise the system operates as if a "false" conclusion was reached.

Still referring to FIG. 3, an initial presumption of takeoff is made if the WOW sensors indicate "in-air," providing a "true" output from AND gate 40 which activates OR gate 43 to supply a "true" output. Similarly, as represented by AND gate 41, OR gate 43 provides a "true" output if the main landing gear altitude signal indicates an altitude of more than a predetermined height, no more than a few feet and preferably about 2 feet, above the runway, or, as represented by AND gate 42, if CAS is detected at greater than a predetermined speed consistent with flight, preferably about 160 knots. If any one of these three conditions is detected, a determination is made as to whether the plane has pitched to such a degree as to confirm that takeoff has occurred. In the illustrated example, AND gate 44 provides a "true" output if a "true" output is received from OR gate 43 and if pitch attitude of greater than 4.5° is determined. A "true" signal from AND gate 44 passes through an OR gate 46 to set the latch to the "in-air" state. Thus, indication of pitch rotation provides a check on a takeoff determination based on WOW, landing gear altitude or CAS.

A backup is provided in the form of a "true" signal from an AND gate 48 which is actuated if Mach number of greater than a predetermined value, preferably about 0.45, is detected. In effect, at such a high speed all other aspects of the takeoff determination are overridden so that the in-air status is set.

Figure 4:
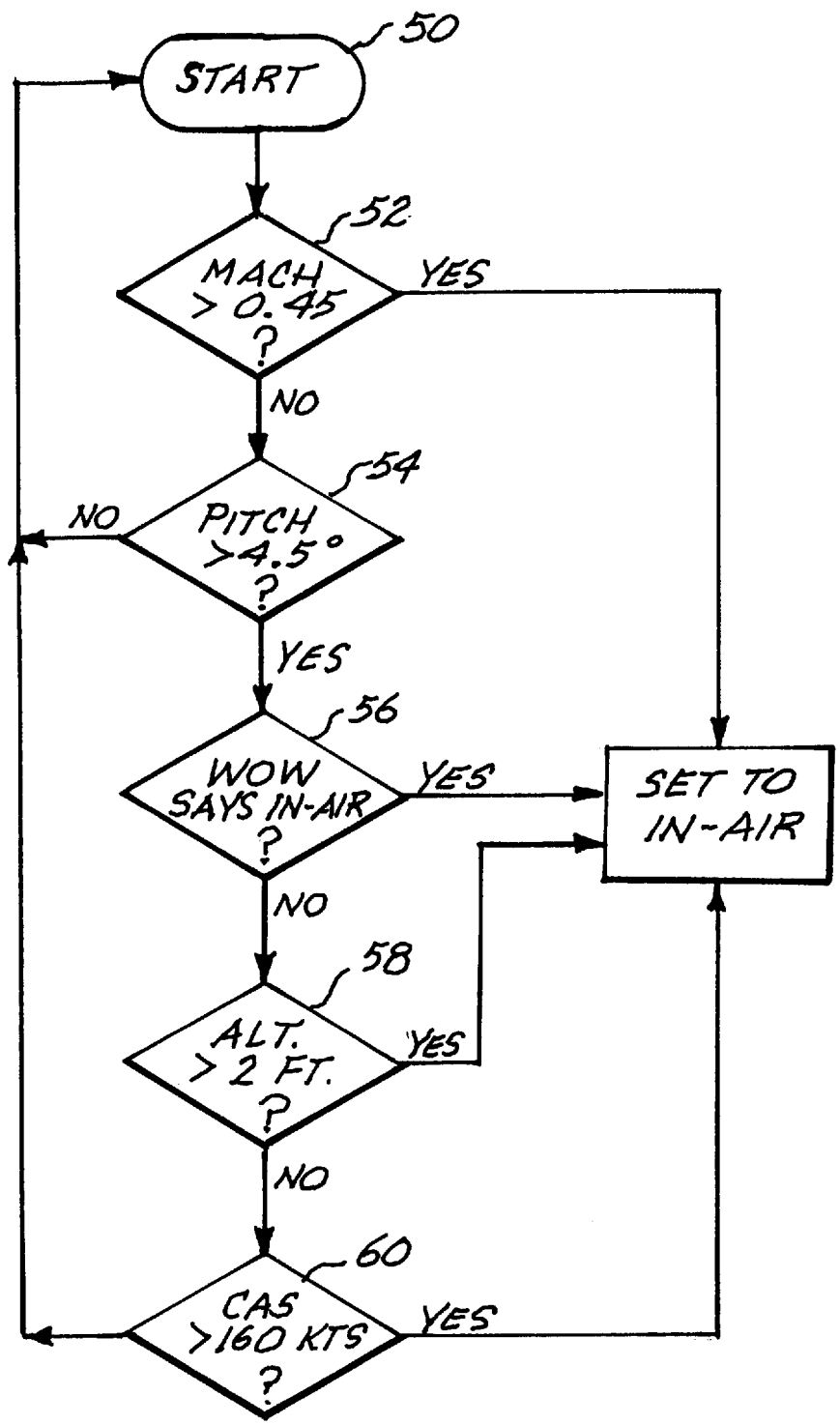
FIG. 4 is a flow diagram of the ground to air transition determination function.

FIG. 4 illustrates the operation of the ground to air determination function in flow diagram form. Proceeding downward from start box 50, if Mach speed greater than 0.45 is detected, the latch is immediately set to "in-air". Otherwise, it is determined whether pitch is greater than 4.5° (box 54). If so, the latch is set to "in-air" if any of WOW (box 56), landing gear altitude (box 58) or CAS (box 60) confirm takeoff. Otherwise, the system recycles to start.

Figure 5:
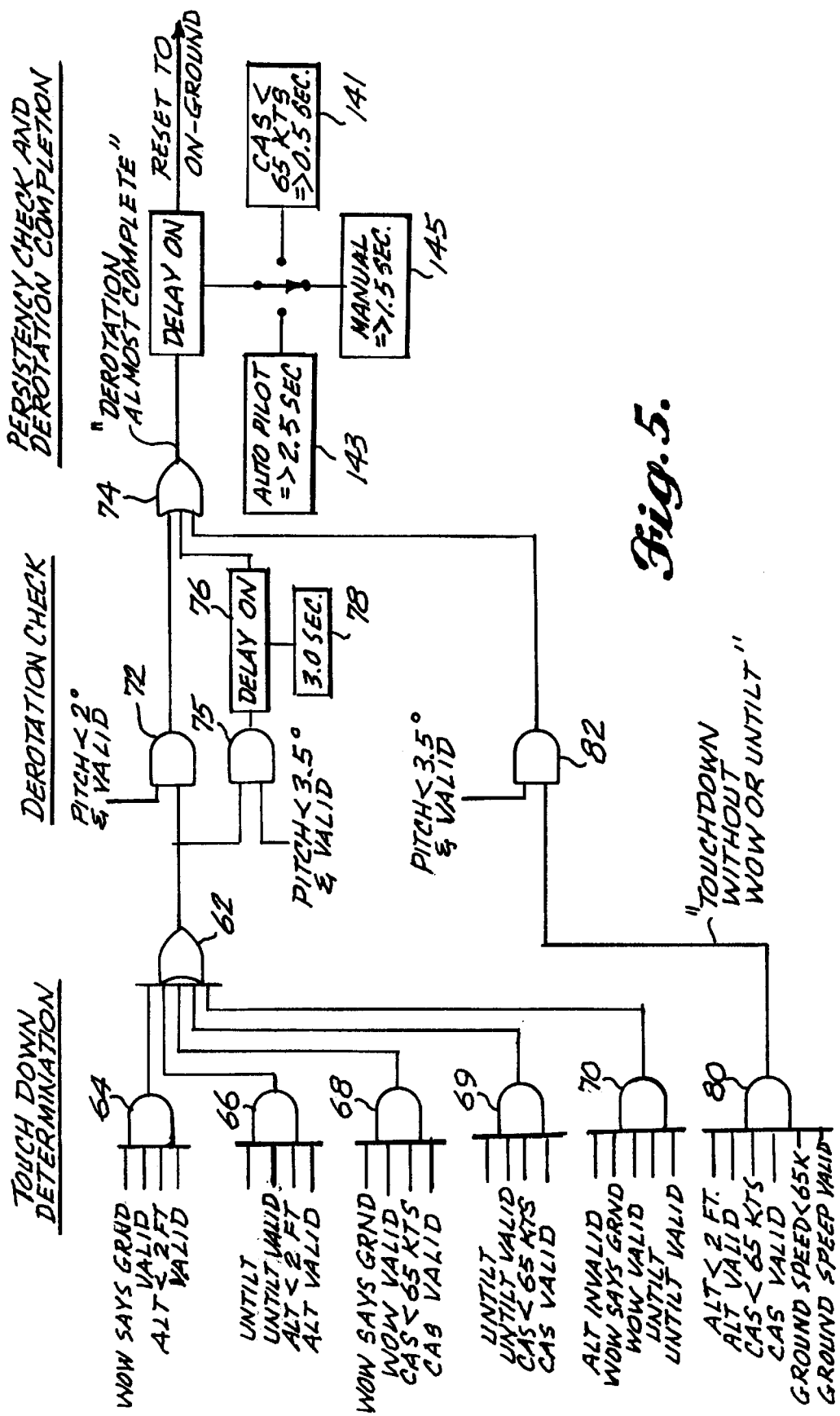
FIG. 5 is a logic diagram of the air to ground transition determination function of the present invention.

FIG. 5 shows the logic of the air to ground transition determination which is made during landing. For air to ground transition, "true" corresponds to an "on-ground" conclusion. Moving from the left of OR gate 62, any of the following combinations is taken as an indication of touchdown resulting in a "true" output of the OR gate:

WOW indicates "on-ground," and landing gear altitude below 2 feet (AND gate 64);
truck not tilted (UNTILT), and landing gear altitude below 2 feet (gate 66);
WOW "on-ground," and CAS less than a predetermined speed consistent with landing and inconsistent with flight, preferably about 65 knots (gate 68);
truck not tilted, and CAS less than a predetermined speed consistent with landing and inconsistent with flight, preferably about 65 knots (gate 69);
landing gear altitude invalid (i.e., radio altimeter failure), WOW "on-ground"; and truck not tilted (gate 70).

If any of these combinations are detected, touchdown is presumed.

The next step is to determine whether or not derotation has occurred, i.e., the pitch angle has decreased sufficiently following touchdown that a true "on-ground" condition is inevitable, including the nose wheel on the ground. As represented by AND gate 72, if pitch attitude reaches less than a very small acute angle, preferably about 2°, the "true" signal from OR gate 62 immediately actuates an OR gate 74 to provide a "true" output. Alternatively, as indicated by AND gate 75, if pitch attitude reaches less than a larger but still small acute angle, preferably about 3.5°, but more than 2°, there is the possibility that a bounced landing is occurring or other condition which would delay derotation. In that case, as represented by boxes 76 and 78, a delay, preferably about 3 seconds, occurs prior to sending a "true" signal to OR gate 74. Thus, if pitch attitude reaches 3.5° and stays above 2° for more than 3 seconds while a "true" signal continues to be supplied by OR gate 62, OR gate 74 is activated by a "true" input; but OR gate 74 is immediately activated if pitch angle falls below 2°.

There is another combination of conclusions for activating OR gate 74, as represented toward the bottom of FIG. 5, namely, low landing gear altitude (below 2 feet), low CAS (less than 65 knots) and low ground speed (less than 65 knots), all of which are inputs to AND gate 80, in combination with a detected small pitch attitude (less than 3.5°) as represented by AND gate 82. These conditions all confirm touchdown and some derotation, even if both the WOW and truck tilt sensors have failed.

Figure 6:
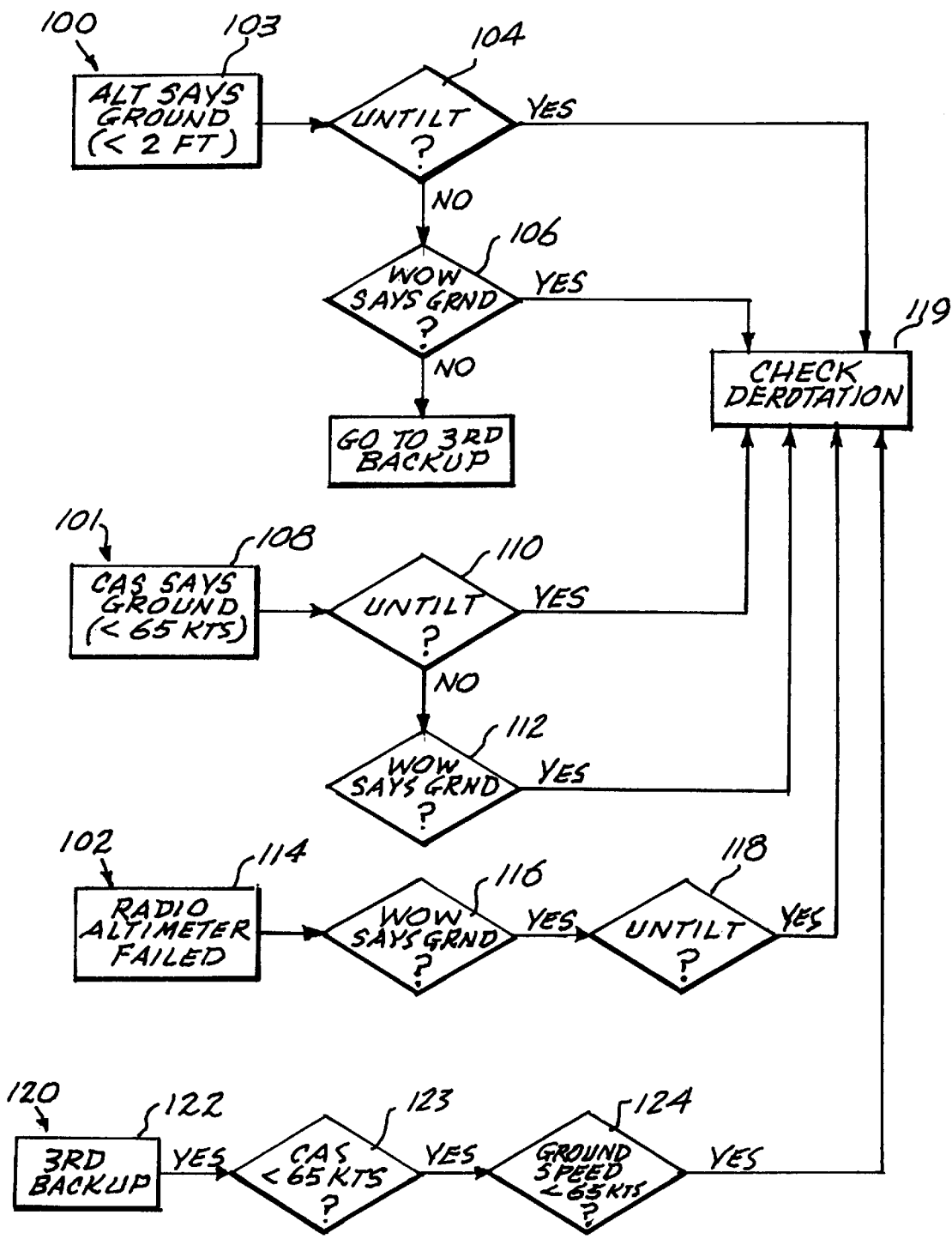
FIG. 6, FIG. 6A and FIG. 6B are flow diagrams of the air to ground determination function.

The logic represented in FIG. 5 can be implemented in software using conventional techniques. FIG. 6 represents one set of corresponding flow diagrams to illustrate the most likely procedures that will confirm touchdown and derotation. In a typical landing, the aircraft will flare to a relatively high pitch angle prior to reaching the low landing gear altitude necessary for an "on-ground" indication from the landing gear altitude sensor. Next, the landing gear will engage the runway and untilt, followed by WOW detection. Then airspeed and ground speed will decrease. This sequence is represented by the spaced horizontal paths shown in FIG. 6. Three separate routines 100, 101 and 102 start at the left Routine 100 activates the system for the usual landing sequence. Detected "on-ground" landing gear altitude (box 103) controls the touchdown indication if either truck untilt (box 104) or WOW (box 106) confirms.

Routine 101 represents a first backup. Low CAS (box 108) in combination with either UNTILT (box 110) or WOW (box 112) confirmation results in touchdown being signaled, regardless of landing gear altitude detection, such as in the case of radio altimeter failure.

As an additional backup, the third routine 102 signals touchdown if a condition of radio altimeter failed (box 114) is detected in combination with WOW detection (box 116) and UNTILT (box 118).

In any of these instances, derotation is checked as indicated by box 119 prior to sending the "on-ground" signal to the flight control system.

As a final backup, a fourth routine 120 is represented at the bottom of FIG. 6. If low landing gear altitude (box 103 of routine 100) is detected without detection of UNTILT (box 104) or WOW (box 106), a third backup routine is triggered (box 122) in which a separate check of derotation is made if it is determined that both CAS (box 123) and ground speed (box 124) are less than their defined "on-ground" values.

Figure 6A:
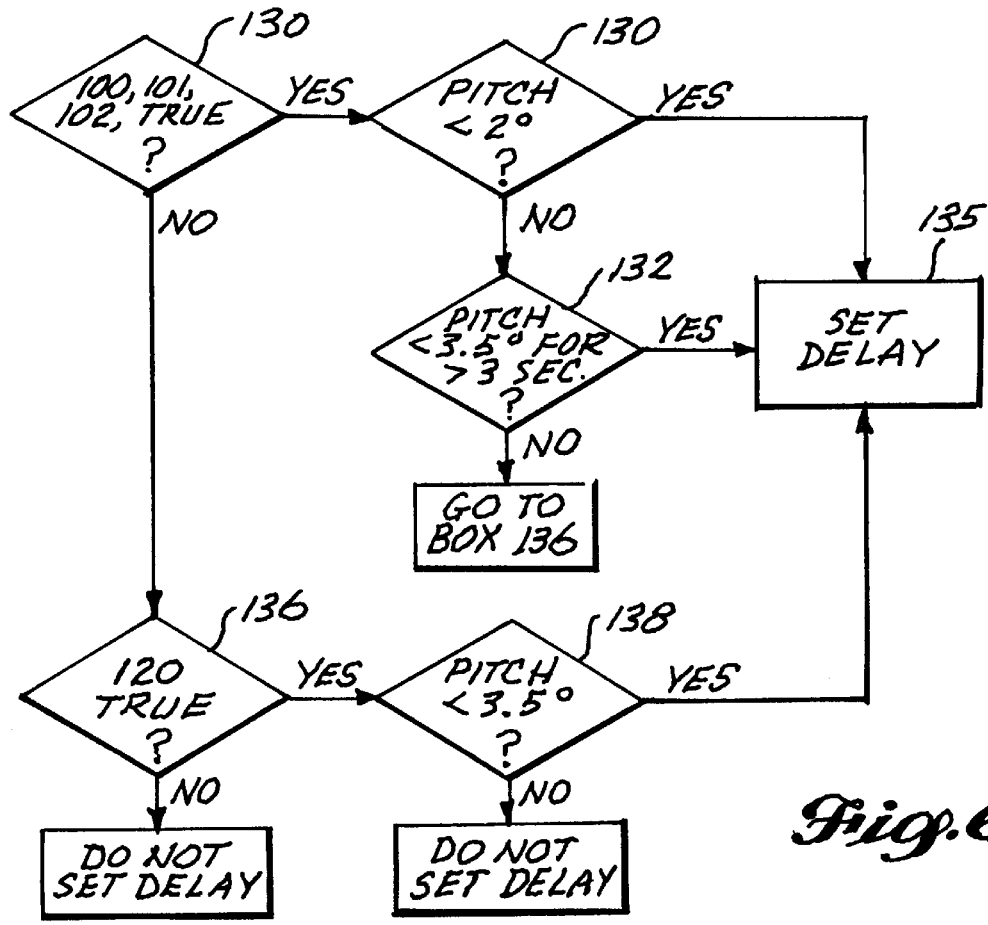

FIG. 6A illustrates the checks of derotation triggered by any of the outputs from routines 100, 101, 102, and 120, being "true," i.e., touchdown has occurred. Beginning from box 130, if any of routines 100, 101, or 102 have given a "true" conclusion of touchdown, an evaluation is made as to whether or not the pitch angle has reached less than the very small acute angle (2°), as represented by box 131. If so, a delay is set (box 135) to approximate the time to a "true" on-ground condition which is reached when the nose wheel engages the runway. If pitch angle is greater than the small angle, the evaluation is made as to whether or not pitch angle is less than the larger angle (3.5°) and has stayed there for the predetermined period (3.0 seconds) as indicated in box 132, in which case the delay will be set provided that routine 100, 101 or 102 has continued to provide a "true" output.

If none of routines 100, 101 or 102 indicates that touchdown has occurred, there is the additional evaluation as to whether or not subroutine 120 confirms touchdown due to low airspeed and ground speed (box 136). In that case, if the pitch angle is below the larger angle (3.5°) as indicated by box 138, the delay is set. Otherwise, no signal of touchdown and derotation is provided.

Figure 6B:
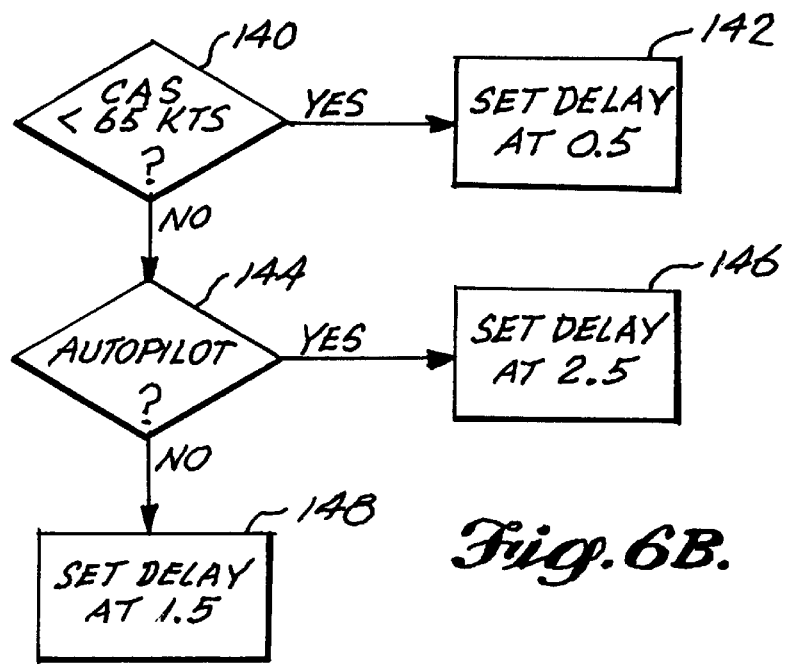

FIG. 6B represents the procedure of setting the delay which is required because there is no other reliable indication of the nose wheel engaging the ground Rather, depending on the landing sequence followed, the delay is set to approximate the time at which the nose wheel will engage the runway. First, as represented by box 140 of FIG. 6B and box 141 of FIG. 5, if CAS below the predetermined speed (65 knots) is detected, the delay is set at 0.5 second (box 142). In the absence of CAS below the predetermined speed, if the landing is by autopilot (decision box 144), the delay is set at 2.5 seconds (box 146, see also box 143 of FIG. 5), whereas if the landing is by manual pilot control (i.e., autopilot off), the delay is set at 1.5 seconds (box 148 see also box 145 of FIG. 5). Immediately after the elapse of the appropriate delay, a signal is sent to reset the latch to its "on-ground" state.

Figure 7:
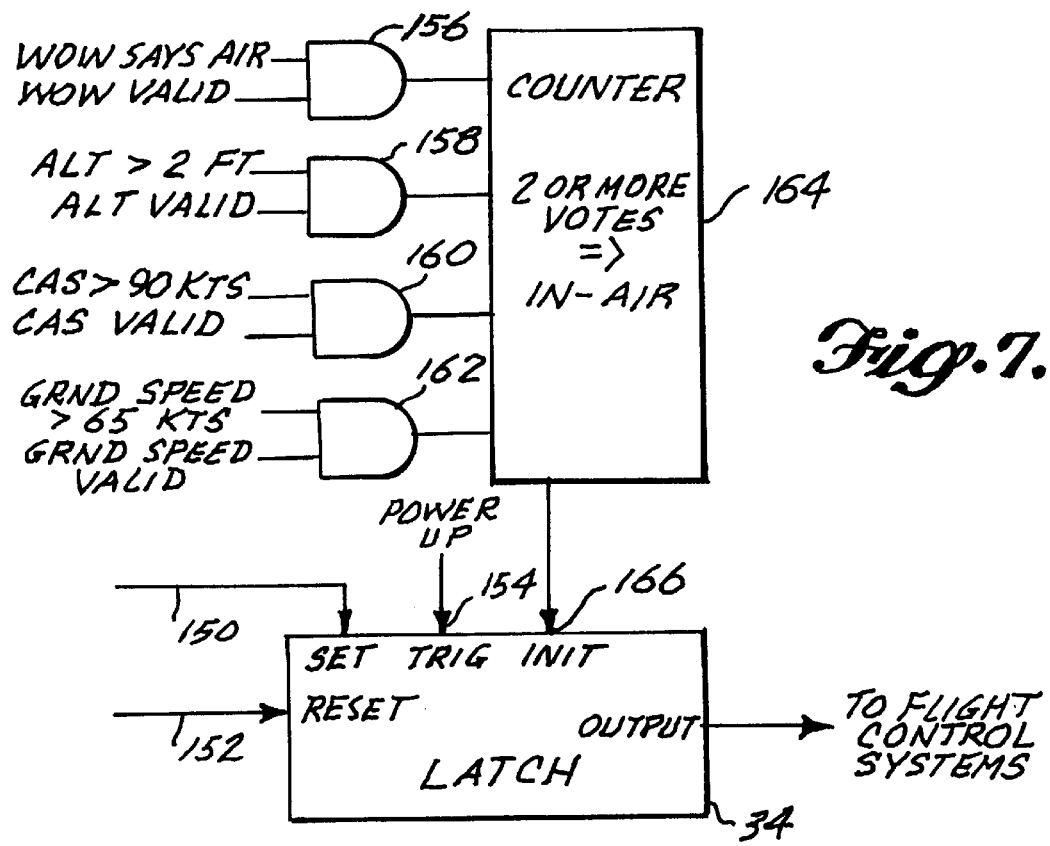
FIG. 7 is a block and logic diagram of the initialization function and latch of the present invention.

With reference to FIG. 7, a "true" signal from the ground to air determination function sent along line 150 sets the latch 34 to in-air. Similarly, a "true" signal from the air to ground determination function along line 152 resets the latch to on-ground, provided that the signal on line 150 (SET) is false. The SET signal has priority, i.e., if "true" signals are received from both the ground to air and air to ground functions, the latch is set to or stays in the "in-air" state.

At power up, a trigger 154 is actuated which allows the latch to be set based on the initialization function if both the ground to air and air to ground conditions are provided to the latch as "false". According to that function, if two or more of WOW (gate 156), landing gear altitude (gate 158), CAS (gate 160), or ground speed (gate 162) indicate "in-air," a counter 164 sends a signal to the initialization input 166 of the latch and the latch output is set to "in-air." It should be emphasized that the initialization function occurs only if both the ground to air and air to ground transition functions provide "false" outputs and the trigger receives the power up signal.

Figure 8:
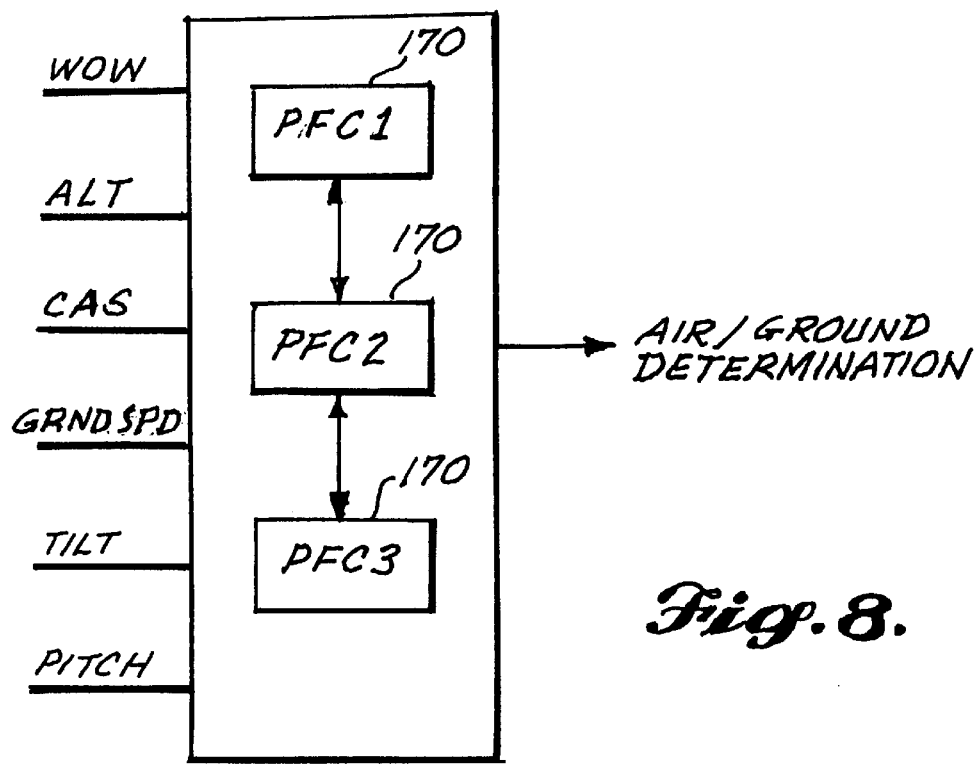
FIG. 8 is a block diagram illustrating operation of the system of the present invention with multiple flight computers.

With reference to FIG. 8, each of the air/ground signals is provided to a primary flight computer (PFC) 170 of the aircraft. Such signals are preferably generated by multiple sensors and are conveyed over multiple paths as represented by the bold lines at the left of FIG. 8. In the Boeing 777-200, three such PFC's are provided, and each of them independently evaluates whether the aircraft is in the air or on the ground in accordance with the procedure discussed above. Each PFC is in communication with the others to evaluate the conclusions reached by the others. A majority "vote" of the three PFC's determines the air/ground signal for all flight control systems. If any primary flight computer is not operable, its "vote" is counted as "in-air" because it is better to erroneously presume an in-air condition than an on-ground condition.

While the preferred embodiment of the invention has been illustrated and described, it will be appreciated that various changes can be made therein without departing from the spirit and scope of the invention. For example, in the preferred embodiment, aircraft speed is judged based on calibrated air speed and Mach number relying on the pitot tube, and ground speed is based on the inertial reference unit. Other reliable indications of air speed and ground speed could be used. Similarly, any reliable indication of touchdown may be used instead of or in conjunction with WOW or TILT. If a reliable signal of nose wheel engagement with ground is available, checks based rotation-derotation and delays approximating nose wheel engagement with the ground could be modified or may not be required.

The embodiments of the invention in which an exclusive property or privilege is claimed are defined as follows:

1. A method of supplying a signal to a flight control system of an aircraft to indicate whether the aircraft is in the air or on the ground which method comprises:
   receiving several different signals each of which provides a conclusion of whether the aircraft is in the air or on the ground, the several different conclusion signals including at least three different signals of the following group: WOW, TILT-UNTILT, airspeed, ground speed, Mach number, altitude and pitch;
   evaluating the conclusion signals to determine which conclusion signals are in agreement as to whether the aircraft is in the air or on the ground;
   automatically supplying an in-air output if, for any one of a plurality of different predetermined combinations of the conclusions, each conclusion is that the aircraft is in the air; and
   automatically supplying an on-ground output if, for any one of a plurality of different predetermined combinations of the conclusions, each conclusion is that the aircraft is on the ground.

2. The method defined in claim 1, in which at least four different conclusion signals are received.

3. The method defined in claim 2, in which the at least four different conclusion signals include four different signals from the following group: WOW, TILT-UNTILT, airspeed, ground speed, Mach number, altitude and pitch, where WOW equals a true/false indication of whether or not weight on the main landing gear is above or below a predetermined weight consistent with the aircraft resting on the ground, TILT-UNTILT is a true/false indication of whether the landing gear truck is tilted or untilted indicative of in-flight or on ground condition, airspeed is a true/false indication of whether aircraft is traveling above or below one or more predetermined airspeeds, ground speed is a true/false indication of whether or not the aircraft is traveling at a ground speed greater or less than one or more predetermined group speeds, Mach number is a true/false indication as to whether or not the aircraft is traveling at a Mach number greater or less than a predetermined Mach number, altitude is a true/false indication of whether the aircraft is above or below a predetermined altitude and pitch is a true/false indication as to whether the aircraft is disposed at an angle greater or less than one or more predetermined angles.

4. The method defined in claim 1, including receiving the conclusion signals in a primary flight computer.

5. The method defined in claim 1, including receiving the conclusion signals in multiple primary flight computers for independently analyzing whether the aircraft is in the air or on the ground.

6. The method defined in claim 5, including receiving the conclusion signals in three primary flight computers each of which independently determines whether the aircraft is in the air or on the ground, comparing the conclusions reached by the three primary flight computers, and controlling the outputs to correspond to the air/ground determination reached by a majority of the primary flight computers.

7. A method of supplying a signal indicating transition of an aircraft from ground to air which comprises the steps of:
   (1) receiving a plurality of different signals based on different criteria, each indicating a conclusion of whether or not the aircraft has taken off;
   (2) measuring the pitch of the aircraft independently of the different signals received in step (1); and
   (3) if any one of the signals of step (1) indicates that the aircraft has taken off, and only if the pitch of the aircraft as measured in step (2) is sufficient to indicate that rotation has occurred, automatically supplying an output signal indicating that transition from ground to air has occurred.

8. The method defined in claim 7, in which the conclusion signals of step (1) are selected from the group consisting of WOW, altitude and speed.

9. The method defined in claim 7, including, if any of the conclusion signals of step (1) indicate that takeoff has occurred, evaluating whether the pitch of the aircraft as measured in step (2) is greater than a predetermined angle and, if so, supplying the output signal.

10. The method defined in claim 7, including evaluating whether or not the speed of the aircraft is greater than a predetermined speed and, if so, providing the output signal regardless of the determinations based on takeoff and pitch.

11. The method defined in claim 10, in which the speed indication is by evaluation of Mach number.

12. The method defined in claim 7, in which at least three different conclusion signals are received based on three different criteria.

13. The method of supplying a signal indicating transition of an aircraft from air to ground which comprises the steps of:
   (1) receiving several different signals each of which provides a conclusion of whether the aircraft is in the air or on the ground;
   (2) comparing several predetermined different combinations of the conclusion signals to determine whether or not any of the predetermined combinations are in agreement as to touchdown having occurred;
   (3) measuring the pitch of the aircraft independently of the different signals received in step (1); and
   (4) if any of such predetermined combinations agree that touchdown has occurred, evaluating the pitch of the aircraft as measured in step (3) to determine whether or not derotation to one or more predetermined angles has occurred and, if so, supplying an output signal indicating that air to ground transition has occurred.

14. The method defined in claim 13, including delaying the output signal for a predetermined period after determining derotation of the aircraft to one or more predetermined angles.

15. The method defined in claim 13, in which the conclusion signals are selected from the group consisting of WOW, TILT-UNTILT, altitude, airspeed, and ground speed.

16. A system for supplying a signal to a flight control system of an aircraft to indicate whether the aircraft is in the air or on the ground which system comprises:
   means for generating several different signals based on different criteria, each of said signals providing a conclusion of whether the aircraft is in the air or on the ground, said different conclusion signals including at least three different signals from the following group: WOW, TILT-UNTILT, airspeed, ground speed, Mach number, altitude and pitch;
   means for evaluating the conclusion signals to determine which conclusion signals are in agreement as to whether the aircraft is in the air or on the ground;
   means for automatically supplying an in-air output if, for any one of a plurality of different predetermined combinations of the conclusions, each conclusion is that the aircraft is in the air; and
   means for automatically supplying an on-ground output if, for any one of a plurality of different predetermined combinations of the conclusions, each conclusion is that the aircraft is on the ground.

17. The system defined in claim 16, in which the generating means generates at least four different conclusion signals are received.

18. The method defined in claim 17, in which the generating means generates at least four different conclusion signals selected from the group consisting of WOW, TILT-UNTILT, airspeed, ground speed, Mach number, altitude and pitch, where WOW equals a true/false indication of whether or not weight on the main landing gear is above or below a predetermined weight consistent with the aircraft resting on the ground, TILT-UNTILT is a true/false indication of whether the landing gear truck is tilted or untilted indicative of in-flight or on ground condition, airspeed is a true/false indication of whether aircraft is traveling above or below one or more predetermined airspeeds, ground speed is a true/false indication of whether or not the aircraft is traveling at a ground speed greater or less than one or more predetermined ground speeds, Mach number is a true/false indication as to whether or not the aircraft is traveling at a Mach number greater or less than a predetermined Mach number, altitude is a true/false indication of whether the aircraft is above or below a predetermined altitude and pitch is a true/false indication as to whether the aircraft is disposed at an angle greater or less than one or more predetermined angles.

19. A system for supplying a signal indicating transition of an aircraft from ground to air which system comprises:
   means for generating a plurality of different signals based on different criteria, each of said signals indicating a conclusion of whether or not the aircraft has taken off;
   means for evaluating the pitch of the aircraft independently of the signals generated by the generating means; and
   means for automatically supplying an output signal indicating that transition from ground to air has occurred if any one of the conclusion signals indicates that the aircraft has taken off and only if the pitch of the aircraft as evaluated by the evaluating means is sufficient to indicate that rotation has occurred.

20. A system for supplying a signal indicating transition of an aircraft from air to ground which system comprises:
   means for generating several different signals each of which provides a conclusion of whether or not the aircraft is in the air or on the ground;
   means for comparing several different combinations of the conclusion signals to determine whether or not any of the predetermined combinations are in agreement as to touchdown having occurred;

means for measuring the pitch of the aircraft independently of the signals generated by the generating means; and means for supplying an output signal indicating that air to ground transition has occurred if any of such predetermined combinations agree that touchdown has occurred and only if the pitch of the aircraft as measured by the measuring means is sufficiently small so as to indicate that derotation to one or more predetermined angles has occurred.

* * * * *